United States Patent
Scholzen et al.

(10) Patent No.: US 9,476,796 B2
(45) Date of Patent: Oct. 25, 2016

(54) DEVICE FOR DETECTING A PRESSURE, IN PARTICULAR A COMBUSTION CHAMBER PRESSURE OF AN INTERNAL COMBUSTION ENGINE

(75) Inventors: Holger Scholzen, Stuttgart (DE); Martin Gorzolka, Erdmannhausen (DE); Janpeter Wolff, Wurmberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/113,455

(22) PCT Filed: Mar. 8, 2012

(86) PCT No.: PCT/EP2012/054012
§ 371 (c)(1),
(2), (4) Date: Jan. 6, 2014

(87) PCT Pub. No.: WO2012/146430
PCT Pub. Date: Nov. 1, 2012

(65) Prior Publication Data
US 2014/0174164 A1      Jun. 26, 2014

(30) Foreign Application Priority Data
Apr. 28, 2011   (DE) .......... 10 2011 017 667

(51) Int. Cl.
*G01M 15/08*     (2006.01)
*G01L 19/04*     (2006.01)
*G01L 23/10*     (2006.01)

(52) U.S. Cl.
CPC .............. *G01M 15/08* (2013.01); *G01L 19/04* (2013.01); *G01L 23/10* (2013.01)

(58) Field of Classification Search
CPC ...... G01L 23/10; G01L 19/04; F02D 35/023; G01M 15/08
USPC ......................................... 73/114.16, 114.18
See application file for complete search history.

(56) References Cited

U.S. PATENT DOCUMENTS

| | | | | | |
|---|---|---|---|---|---|
| 5,142,914 | A | * | 9/1992 | Kusakabe et al. | 73/723 |
| 5,168,192 | A | * | 12/1992 | Kosugi et al. | 310/338 |
| 5,199,303 | A | * | 4/1993 | Benedikt et al. | 73/727 |
| 5,249,468 | A | * | 10/1993 | Benedikt et al. | 73/706 |

(Continued)

FOREIGN PATENT DOCUMENTS

| | | |
|---|---|---|
| CN | 1904348 | 1/2007 |
| CN | 101128723 | 2/2008 |

(Continued)

OTHER PUBLICATIONS

International Search Report for PCT/EP2012/054012 dated Jul. 18, 2012.

*Primary Examiner* — Freddie Kirkland, III
(74) *Attorney, Agent, or Firm* — Norton Rose Fulbright US LLP

(57) ABSTRACT

A device for detecting a pressure, in particular in a combustion chamber of an internal combustion engine, has a housing and an adapter element secured in the housing for accommodating a sensor module. The sensor module includes at least one sensor element and one support element. The sensor element makes electrical contact with connecting lines which extend in the axial direction of the sensor module. The support element has a section on which support surfaces are formed for the connecting lines.

7 Claims, 3 Drawing Sheets

(56) References Cited

U.S. PATENT DOCUMENTS

| | | | |
|---|---|---|---|
| 5,353,633 A * | 10/1994 | Benedikt et al. | 73/114.18 |
| 5,377,547 A * | 1/1995 | Kusakabe et al. | 73/723 |
| 5,488,868 A * | 2/1996 | Ootake et al. | 73/708 |
| 5,503,023 A * | 4/1996 | Benedikt et al. | 73/726 |
| 5,521,581 A * | 5/1996 | Proulx | 340/449 |
| 5,606,117 A * | 2/1997 | Vogel et al. | 73/114.18 |
| 5,703,282 A * | 12/1997 | Kuesell et al. | 73/114.18 |
| 6,962,085 B2 * | 11/2005 | Oda et al. | 73/727 |
| 8,256,279 B2 * | 9/2012 | Siegenthaler et al. | 73/114.16 |
| 8,857,250 B2 * | 10/2014 | Doering et al. | 73/114.18 |
| 9,016,115 B2 * | 4/2015 | Scholzen et al. | 73/114.18 |
| 2004/0255683 A1 * | 12/2004 | Barron | 73/719 |
| 2010/0294028 A1 | 11/2010 | Siegenthaler et al. | |
| 2012/0234084 A1 * | 9/2012 | Ledermann et al. | 73/114.18 |
| 2014/0102185 A1 * | 4/2014 | Scholzen et al. | 73/114.18 |

FOREIGN PATENT DOCUMENTS

| | | |
|---|---|---|
| DE | 10 2010 038 798 | 2/2012 |
| JP | 63-078238 | 5/1988 |
| JP | 2005090954 | 4/2005 |
| JP | 2009527748 | 7/2009 |
| JP | 2010271321 | 12/2010 |
| WO | WO2009146565 | 12/2009 |

* cited by examiner

DEVICE FOR DETECTING A PRESSURE, IN PARTICULAR A COMBUSTION CHAMBER PRESSURE OF AN INTERNAL COMBUSTION ENGINE

CROSS REFERENCE TO RELATED APPLICATIONS

The present application is the national stage entry of International Patent Application No. PCT/EP2012/054012, filed on Mar. 8, 2012, which claims priority to Application No. DE 10 2011 017 667.5, filed in the Federal Republic of Germany on Apr. 28, 2011.

FIELD OF INVENTION

The present invention relates to a device for detecting a pressure, in particular a combustion chamber pressure of an internal combustion engine.

BACKGROUND INFORMATION

Devices for detecting the combustion chamber pressure of an internal combustion engine are described, for example, in German Application No. DE 10 2010 038 798. Two specific embodiments are described, the first specific embodiment describing a single device for detecting the combustion chamber pressure, in which a sensor module having a sensor element for pressure detection is situated in a housing, the pressure of the combustion chamber being transmitted to the sensor element via a diaphragm. The other specific embodiment relates to an integrated approach of a sensor module having a sensor element for pressure detection, in which the sensor module is integrated into a sheathed-element glow plug, the sensor module being coupled to a glow element of the sheathed-element glow plug. The pressure of the combustion chamber is transmitted to the sensor element via the glow element.

SUMMARY

An object of the present invention is to design the sensor module such that the device for detecting the pressure may be installed more easily and efficiently.

The device according to the present invention creates a defined spacing and a defined position for the connecting lines on the pre-installed sensor module. It is thus possible to install the device more easily and efficiently.

An advantageous exemplary embodiment is achieved if the section perpendicular to the longitudinal extent of the sensor module has a cross section that is larger than the cross section of the sensor element and if the support surfaces are situated on an outer surface of the section.

The adaptation of the connecting lines in the radial arrangement to the position of the contact tabs of the sensor element may thus be easily achieved by the outer surface being formed from a cylindrical peripheral surface and by the support surfaces being formed on the cylindrical peripheral surface. Finally, it is suitable to design the section to have a circular front surface with which the support element supports itself on a fixing element fixed to the housing.

In order to form the support surfaces on the section having the larger cross section perpendicular to the longitudinal extent of the sensor module, it is provided that the section is formed on the support element on the fixing element side in the axial direction of the sensor module and spaced from the sensor element, that another section is provided on the support element on the sensor element side, and that the cross section of the section on the fixing element side in the longitudinal extent of the sensor module is greater than the cross section of the section on the sensor element side in the same direction. A defined radial spacing is thus formed for another secure positional orientation for the connecting lines at an axial distance from the contact tabs of the sensor element, the defined spacing essentially corresponding to the radial spacing of the contact tabs of the sensor element.

The support element may be easily and advantageously manufactured as a ceramic body if the support element has a conical transitional section between the section on the combustion chamber side and the section on the connection side.

Easy handling of the sensor module when installing the device is possible if the sensor element and the support element are fixed and centered with the aid of a shrinkable tubing, the shrinkable tubing also pressing the connecting lines against the support surfaces, thereby fixing the connecting lines on the sensor module in a simple manner. The connecting lines are advantageously designed as flat busbars.

The sensor module is pre-tensioned between the compensation body and a fixing element with the aid of a pre-tensioning force. For this purpose, the fixing element is connected securely to the adapter element with the aid of a sleeve-shaped connection part.

The connecting lines thus receive additional guidance in the axial direction outside the sensor module by the fixing element having recesses for the axial passage of the connecting lines.

Exemplary embodiments of the present invention are described herein in greater detail with reference to the accompanying drawings.

DETAILED DESCRIPTION

Figure 1:
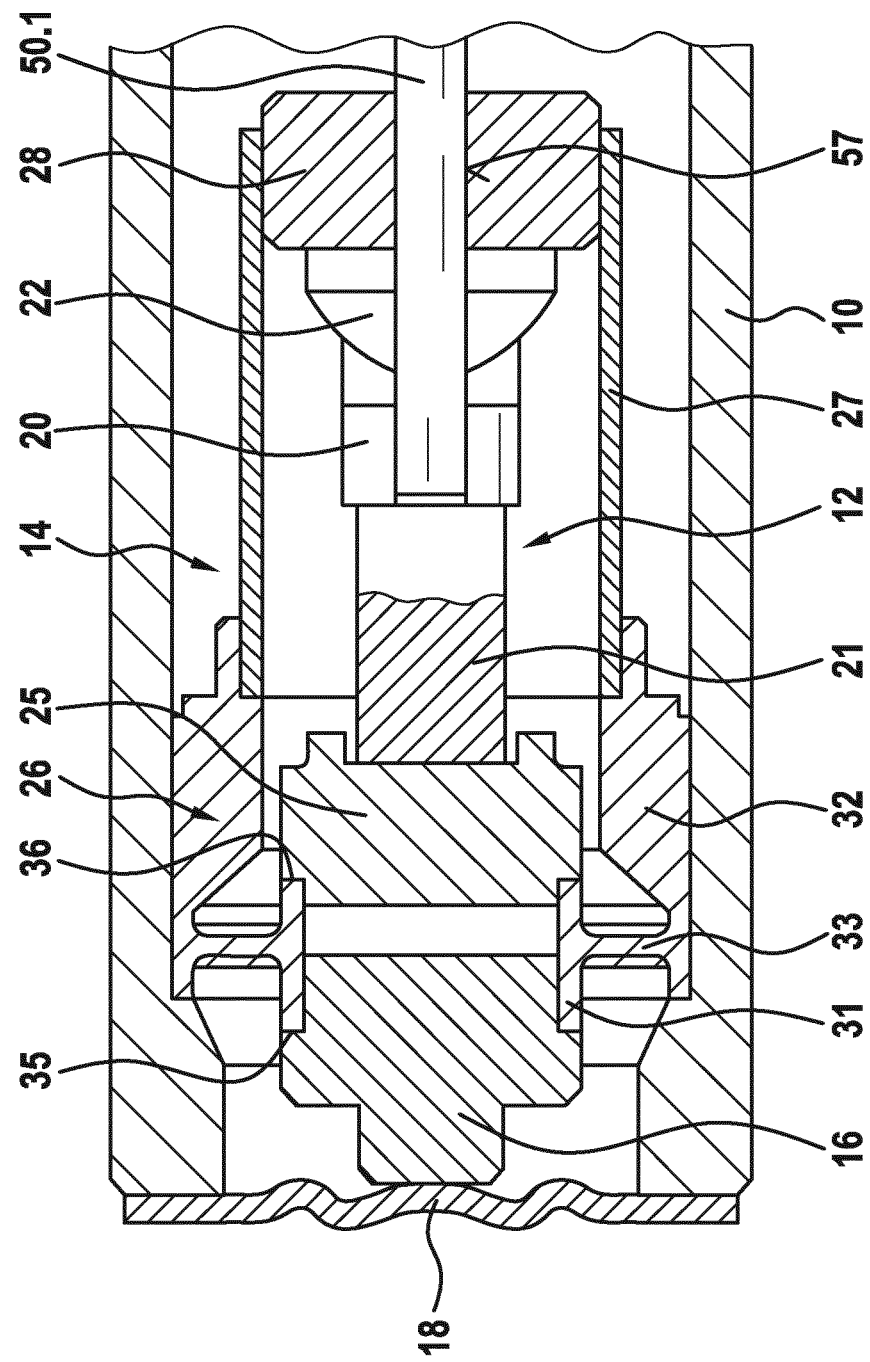
FIG. 1 shows a sectional view of a device for detecting the pressure in a combustion chamber of an internal combustion engine.

The device for detecting the pressure in a combustion chamber of an internal combustion engine has at least one housing 10 in which a sensor module 12 is situated, which is acted upon by the pressure of the combustion chamber via a force path 14.

Sensor module 12 includes a sensor element 20 to which a transmission element 21 is attached on the combustion chamber side and a support element 22 is attached on the opposite side. For manufacturing purposes, sensor element 20, which is designed as a piezoelectric sensor, has an angular cross section, preferably a square cross section, which is at a right angle to the axial extent of sensor module 12. Sensor element 20 has small contact plates 38, which protrude over the cross section of sensor element 20 with contact tabs 39.1 and 39.2. Contact tabs 39.1, 39.2 make contact with electrical connecting lines 50.1 and 50.2, which, for example, are designed as flat busbars. Connecting lines 50.1 and 50.2 lead in the axial direction to connecting contacts, which are not illustrated.

Force path 14 includes a pressure sensor 16, a compensation body 25 for providing temperature compensation, an adapter element 26, a sleeve-shaped connecting part 27, and a fixing element 28. Compensation body 25 is preferably designed in a rotationally symmetrical manner.

Adapter element 26 is designed to have a first sectional part 31, a second sectional part 32, and a flexible web 33 essentially running radially between them. Adapter element 26 is connected securely on housing 10 by second sectional part 32. The connection of the adapter element 26 to housing 10 is established by connecting the second sectional part 32 securely to the inner wall of housing 10, for example, with the aid of welding. Adapter element 26 is furthermore connected to pressure sensor 16 on first sectional part 31 on the combustion chamber side and to compensation body 25 on the opposite side. In addition, first sectional part 31 is designed to have a receptacle 35 against which pressure sensor 16 rests. On the opposite side, first sectional part 31 has a support 36 on which compensation body 25 supports itself. The axial distance between compensation body 25 and fixing element 28 is bridged by sleeve-shaped connecting part 27, which is connected on the one hand to adapter element 26 and on the other hand to fixing element 28, for example, with the aid of welding.

Apart from above-described force path 14, via which direct forces, movements, or pressures are transmitted from pressure sensor 16 to sensor element 20, paths through the housing must also be included. Since it is possible to accommodate different materials in the transmission paths which may have varying degrees of thermal expansion, thermomechanical tensions may occur with the high temperature fluctuations to which the device may be subjected due to these varying degrees of expansion. These thermomechanical tensions may result in corruption of the measuring results or may even cause damage to the device. In order to prevent this, compensation body 25 is located upstream from sensor module 12 on force path 14. Compensation body 25 may, for example, be equipped through a suitable selection of its length and/or its thermal expansion coefficient such that the thermal expansions of the various transmission paths are at least largely identical, at least within typical temperature ranges to which the device may be subjected.

In a stand-alone device for detecting the combustion chamber pressure shown in FIG. 1, pressure sensor 16 is connected to a diaphragm 18, which is exposed to the combustion chamber. This device is only used to detect the combustion chamber pressure of an internal combustion engine. In another exemplary embodiment which is not shown, pressure sensor 16 is, for example, formed from a glow tube of a sheathed-element glow plug, which is exposed to the combustion chamber of the internal combustion engine.

Sensor module 12 is inserted between compensation body 25 and fixing element 28 with the aid of a pre-tension. For this purpose, transmission element 21, which is made from a ceramic material, supports itself on compensation body 25 on the pressure sensor side. On the fixing element side, sensor module 12 supports itself on fixing element 28 with the aid of support element 22, which is also made from ceramic material.

To improve the force transmission and the force distribution, the components including transmission element 21 and support element 22 which are adjacent to angularly designed sensor element 20 are likewise perpendicular to the axial extent of sensor module 12 and designed to have an angular cross section at least on the contact surfaces with sensor element 20, the cross section being essentially adapted to the existing angular cross section of sensor element 20 which is perpendicular to the axial extent of sensor module 12. In the present exemplary embodiment, sensor element 20 is designed to be quadrangular having a square cross section. Transmission element 21 is also designed to be quadrangular having a square cross section, perpendicular to the axial extent of sensor module 12, and adapted to the cross section of sensor element 20.

Figure 2:
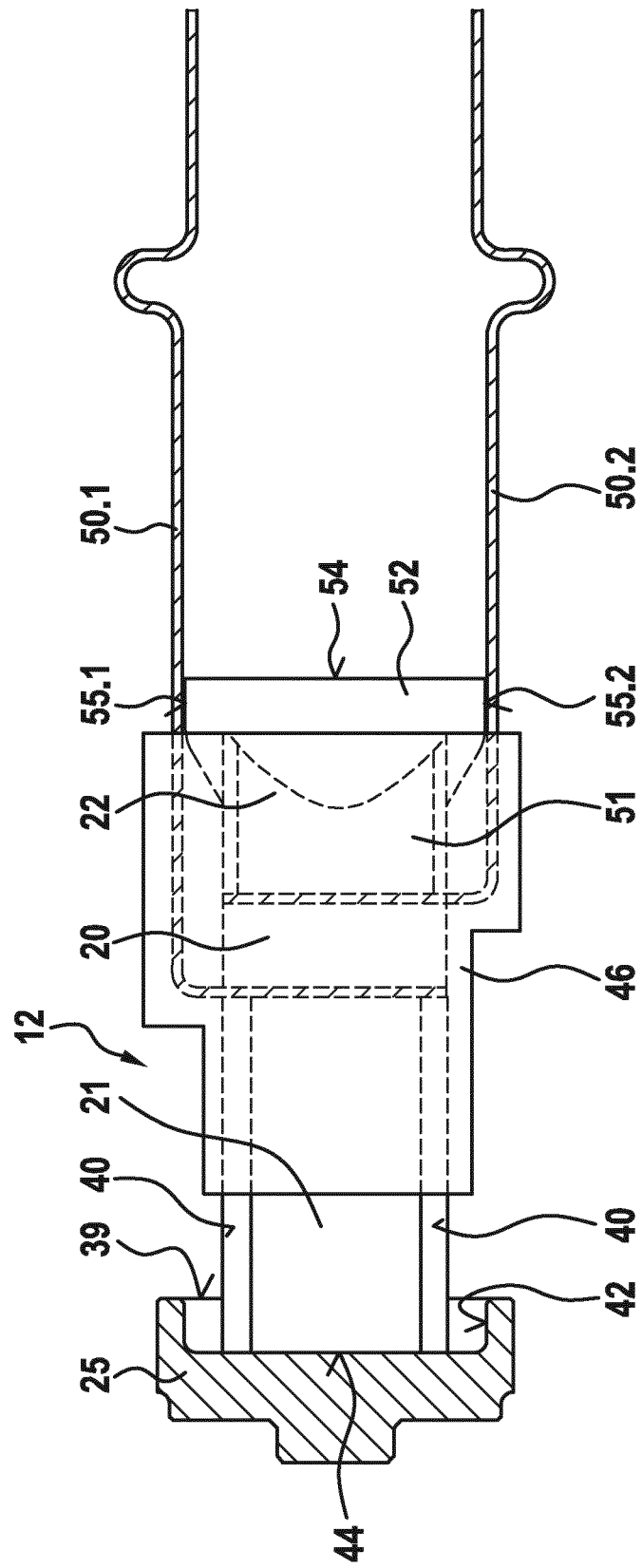
FIG. 2 shows a sectional view of a sensor module of the device according to FIG. 1.
Figure 3:
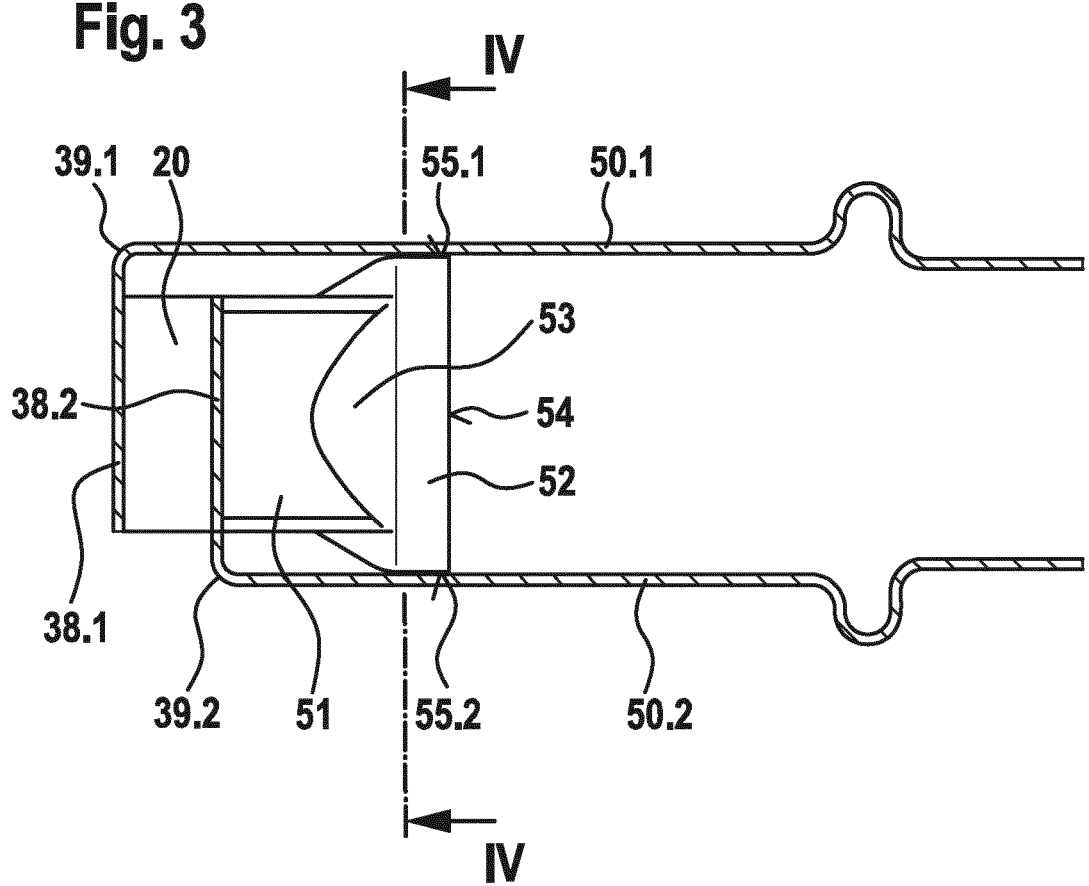
FIG. 3 shows a sectional view of a part of the sensor module in FIG. 2.
Figure 4:
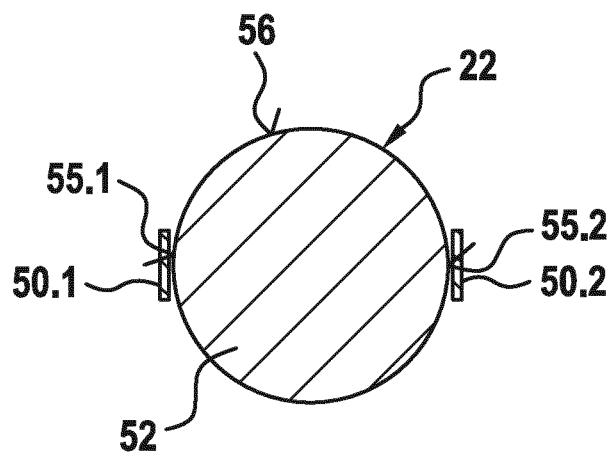
FIG. 4 shows a sectional view according to the line IV-IV in FIG. 3.

According to FIG. 2, compensation body 25 is provided with a circular recess 42 on a front side 39 pointing to sensor module 12 for the coaxial alignment of compensation body 25 and sensor module 12, in which recess transmission element 21 is accommodated with a front side 44. For this purpose, the four corners of transmission element 21 according to FIGS. 3 and 4 are provided with rounded portions 40, which lie on a shared virtual rounding-off circle 41. The diameter of circular recess 42 is slightly larger than the diameter of the virtual rounding-off circle 41 on the transmission element 21. A small amount of play is thus provided between rounding-off circle 41 and circular recess 42, which facilitates the introduction of transmission element 21 into circular recess 42 for assembly purposes. The selected shape of rounded portions 40 makes it possible to center transmission element 21 within compensation body 25. Circular recess 42 of compensation body 25 and virtual rounding-off circle 41 of transmission element 21 thus lie axially on a shared center line.

Support element 22 has a cuboid section 51 adjacent to sensor element 20 on the sensor element side, which has the square cross section which is adapted to the cross section of sensor element 20 and which is perpendicular to the axial extent of sensor module 12. On the opposite side, support element 22 has a section 52 on the fixing element side having a cross section perpendicular to the extent of sensor module 20 which is larger than the cross section of first section 51. In the present exemplary embodiment, section 52 on the fixing element side is designed to be cylindrical having a peripheral surface 56 and a circular front surface 54, support element 22 supporting itself with circular front surface 54 on fixing element 28. In addition, the transition between section 51 on the sensor element side and section 52 on the fixing element side is designed to have a conical transition section 53. Cuboid section 51, conical transitional section 53, and cylindrical section 52 thus overlap, as shown in FIGS. 2 and 3.

Section 52 on the fixing element side has two support surfaces 55.1 and 55.2, against which the two connecting lines 50.1 and 50.2 rest. In the present exemplary embodiment, the two support surfaces 55.1 and 55.2 are formed from two areas on the cylindrical peripheral surface 56. Support surfaces 55.1, 55.2 form a defined radial positional orientation for connecting lines 50.1, 50.2 at an axial distance from contact tabs 39.1, 39.2 of sensor element 20. This defined radial positional orientation via support surfaces 55.1 and 55.2 is essentially predefined by the radial positional orientation of contact tabs 39.1, 39.2.

Sensor module 12 is furthermore surrounded by a shrinkable tubing 46, with which the components of sensor module 12 are fixed during the assembly process. After shrink-wrapping sensor module 12 with shrinkable tubing 46, the tubing fixes and thus centers transmission element 21, sensor element 20, and support element 22 within sensor module 12. In addition to fixing and centering the components of sensor module 12, shrinkable tubing 46 also secures the connecting lines 50.1 and 50.2 to the support surfaces 55.1 and 55.2 in that connecting lines 50.1 and 50.2 are pressed against cylindrical peripheral surface 56.

By attaching the two connecting lines 50.1 and 50.2 to the larger cross section of section 52 on the fixing element side, a defined spacing and a defined position are provided for both connecting lines 50.1 and 50.2 on pre-assembled sensor module 12, the defined position also being fixed via shrinkable tubing 46.

What is claimed is:

1. A device for detecting a pressure in a combustion chamber of an internal combustion engine, comprising:
   at least one housing,
   a sensor module situated in the housing, the sensor module including at least one sensor element and one support element, and the sensor element making electrical contact with connecting lines, which essentially extend in an axial direction of the sensor module, and
   an adapter element secured in the housing,
   wherein the support element has a section on which support surfaces are formed for the connecting lines,
   wherein the section perpendicular to a longitudinal extent of the sensor module has a cross section which is larger than a cross section of the sensor element, and the support surfaces are situated on an outermost surface of the section,
   wherein the sensor element and the support element are fixed with the aid of a shrinkable tubing such that the shrinkable tubing presses the connecting lines against the support surfaces, and
   wherein the outermost surface is formed from a cylindrical peripheral surface of the section, and the support surfaces are formed on the cylindrical peripheral surface.

2. The device according to claim 1, wherein the larger cross section of the section has a circular front surface on a fixing element side with which the support element supports itself.

3. The device according to claim 1, wherein the section is formed on the support element on a fixing element side in the axial direction and spaced from the sensor element, another section is provided on the support element on a sensor element side, and a cross section of the section on the fixing element side is greater than a cross section of the other section on the sensor element side perpendicular to an axial extent of the sensor module.

4. The device according to claim 3, wherein the support element has a conical transitional section between the other section on the sensor element side that is a connection side and the section on the fixing element side that is a combustion chamber side.

5. The device according to claim 1, wherein the connecting lines are designed as busbars.

6. The device according to claim 1, wherein the sensor module is pre-tensioned between a compensation body and a fixing element with the aid of a pre-tensioning force, and the fixing element is connected securely to the adapter element with the aid of a sleeve-shaped connecting part.

7. The device according to claim 6, wherein the fixing element has recesses for axial passage of the connecting lines.

* * * * *